(12) United States Patent
Krammer

(10) Patent No.: US 7,852,066 B2
(45) Date of Patent: Dec. 14, 2010

(54) APPARATUS FOR MEASURING THE RELATIVE POSITION OF TWO PARTS

(75) Inventor: Gert Krammer, Graz (AT)

(73) Assignee: Magna Steyr Fahrzeugtechnik AG & Co. KG, Graz (AT)

( * ) Notice: Subject to any disclaimer, the term of this patent is extended or adjusted under 35 U.S.C. 154(b) by 262 days.

(21) Appl. No.: 12/281,029

(22) PCT Filed: Mar. 2, 2007

(86) PCT No.: PCT/AT2007/000107

§ 371 (c)(1),
(2), (4) Date: Sep. 15, 2008

(87) PCT Pub. No.: WO2007/098522

PCT Pub. Date: Sep. 7, 2007

(65) Prior Publication Data

US 2009/0001968 A1 Jan. 1, 2009

(30) Foreign Application Priority Data

Mar. 2, 2006 (AT) .............................. GM155/2006

(51) Int. Cl.
*G01B 7/14* (2006.01)

(52) U.S. Cl. .............................. 324/207.15; 324/207.11; 324/207.22

(58) Field of Classification Search ............ 324/207.15, 324/207.11, 207.22
See application file for complete search history.

(56) References Cited

U.S. PATENT DOCUMENTS

| 4,631,478 A | 12/1986 | Knetsch et al. |
| 5,497,804 A | 3/1996 | Codina et al. |

FOREIGN PATENT DOCUMENTS

| DE | 1108449 B | 6/1961 |
| DE | 2211359 A1 | 9/1973 |
| DE | 4141545 A1 | 6/1993 |
| DE | 19913869 A1 | 10/2000 |

OTHER PUBLICATIONS

International Preliminary Report on Patentability for PCT/AT2007/000107 issued Oct. 14, 2008.

*Primary Examiner*—Reena Aurora
(74) *Attorney, Agent, or Firm*—Bachman & LaPointe, P.C.

(57) ABSTRACT

Apparatus for measuring the relative position of two parts with a deformable coil, which is connected to both parts and deforms according to their relative position, wherein the inductance of the coil depends on shape and is thus a measure of the relative position, and wherein the coil has a magnetic circuit which is closed in the manner of a toroidal coil.

4 Claims, 1 Drawing Sheet

APPARATUS FOR MEASURING THE RELATIVE POSITION OF TWO PARTS

BACKGROUND OF THE INVENTION

The present invention relates to an apparatus for measuring the relative position of two parts, having a deformable coil which is connected to both parts and deforms according to their relative position, with the inductance of the coil being form-dependent and thus being a measure of the relative position.

Apparatuses of this type are known from DE 11 08 449, DE 32 05 705, DE 41 41 545 or DE 199 13 869. The inductance of the coil is used, for example, as frequency-determining part of a resonant circuit, the frequency of which is measured and is representative of the relative position of the parts; relative movements of the parts can be ascertained subsequently from the temporal change of the relative position.

In all known apparatuses, the coil is formed by one or two concentric or parallel helical springs which constitute simple straight air-core coils. Such air-core coils have the characteristic that their magnetic lines of force close outside the air-core coil. In other words, the magnetic lines of force exit the ends of the helical springs and form a stray field in the surrounding area. In the known embodiments with two concentric or parallel helical springs as well, both helical springs act as open air-core coils with a corresponding stray field.

The occurrence of this stray field has very considerable effects on the proportionality between form change and inductance change of the coil. By way of example, the inductance L of a cylinder-helical coil is calculated at $$L = k \cdot \mu_r \cdot \mu_0 \frac{A \cdot N^2}{l} \qquad (1)$$

where
  k ... demagnetization factor
  $\mu_r$ ... relative permeability
  $\mu_0$ ... permeability
  A ... cross-sectional area of the winding
  N ... number of turns of the winding
  L ... length of the winding The inductance L is thus substantially indirectly proportional to the length l of the winding, e.g. the current stretching or compression of a tension or compression spring used as a coil. The stray field proportion of the coil can be expressed here in terms of the demagnetization factor k which is influenced, to a degree which can only be calculated with difficulty, by the coupling in of external electromagnetic influences, by the permeability of the medium (air) outside the coil and, not least, by assemblies in the surrounding area of the coil. Furthermore, the occurrence of the stray field also means the emission of disturbing electromagnetic waves into the surrounding area.

The object of the invention is to overcome the disadvantages of the known constructions and to provide a measurement apparatus, which is not susceptible to disturbances, with improved measurement accuracy and reproducibility, while having as simple a design as possible.

SUMMARY OF THE INVENTION

The object is achieved by an apparatus of the type mentioned in the introduction, which is distinguished according to the invention by the fact that the coil has a magnetic circuit which is closed in the manner of an annular coil.

The invention is based on the finding that the use of an annular coil or of a coil structure which is closed in the manner of an annular coil can prevent the occurrence of a stray field which influences the measurement in an unpredictable manner. The relation between inductance and form change of the coil can be linearized in this way to the extent that external influences can largely be neglected. The measurement accuracy of the apparatus of the invention is substantially higher than that of the known constructions and largely independent of disturbing environmental influences. Furthermore, the emission of disturbing fields into the surrounding area, e.g. to surrounding assemblies, is significantly reduced.

According to a first advantageous embodiment of the invention, the coil is an annular coil. In an ideal annular coil, the demagnetization factor k=1 and can thus be neglected. It should be noted that in the present description, the term "annular coil" does not necessarily mean an annular coil in the manner of a circular ring, but for example also annular coils with ellipsoid or generally oval profile. The approximation of an annular coil by way of a polygonal line made of straight coil sections forming a magnetic circuit which is closed in the manner of an annular coil is also possible.

An embodiment which is particularly expedient in terms of production engineering is that in which the coil—as known from DE 41 41 545—is formed by two parallel helical springs which are connected, according to the present invention, at their ends in each case via a bridge made of magnetically conducting material to form the closed magnetic circuit. The bridges prevent a stray field from exiting at the ends of the helical springs, since they complement them to form a magnetic circuit which is closed in the manner of an annular coil. This results in the further advantage that the use of parallel straight helical springs, if these are deformed exclusively in the direction of their longitudinal extension, makes possible the use of said proportionality according to equation (1).

The ends of the coil are preferably fitted with fastening elements for anchoring to said parts.

BRIEF DESCRIPTION OF THE DRAWINGS

The invention will be explained in more detail below with reference to exemplary embodiments illustrated in the drawings. In the drawings, FIGS. 1 and 2 schematically show the apparatus of the invention in plan view in two different operating states.

DETAILED DESCRIPTION

Figure 1:
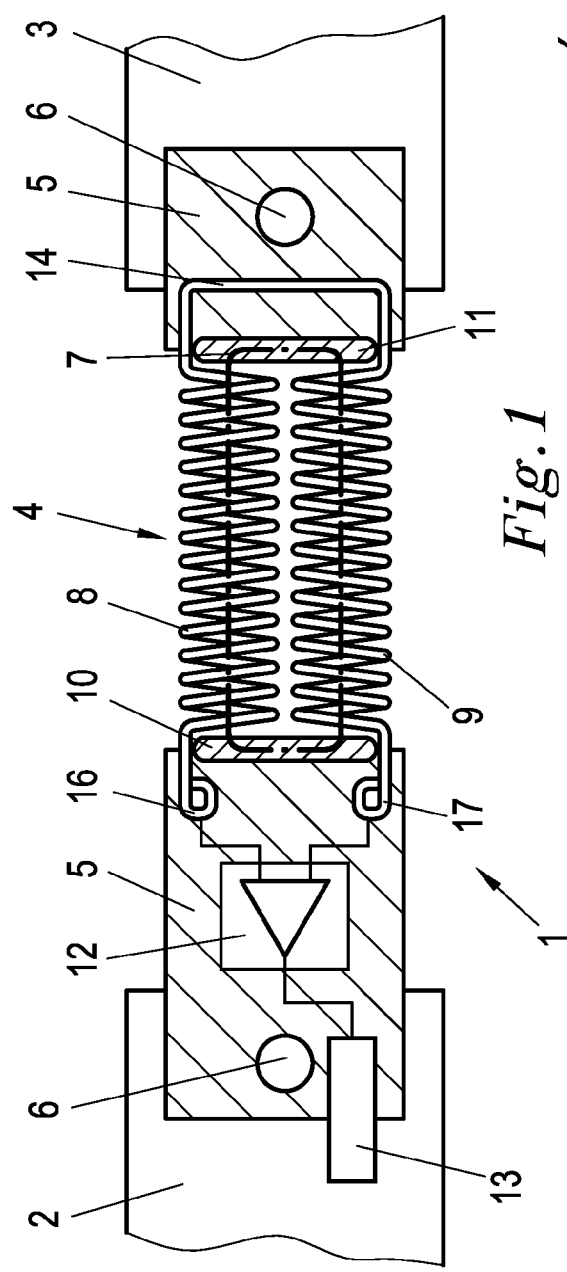

FIG. 1 shows an apparatus 1 for measuring the relative position of two parts 2, 3 which are illustrated only partially. The term "relative position" comprises the spacing, the angle of rotation and also a possible transverse offset of the parts 2, 3. Evaluating the changes in the relative position also makes possible the measurement of relative movements of the parts 2, 3 and subsequently of relative velocities, relative accelerations, relative movement paths etc., as is known to the person skilled in the art.

The apparatus 1 has a deformable coil 4 which is connected at two opposite sides in each case to one of the parts 2, 3, to be more precise via fastening elements 5 with holes 6 for anchoring on the parts 2, 3.

The coil 4 has a magnetic circuit 7 which is closed in the manner of an annular coil. For this purpose, the coil 4 can either be an annular coil (toroid), in which type of coil all the magnetic field lines run inside the coil. Alternatively, two parallel helical springs 8, 9 are used as the coil 4, which helical springs 8, 9 act in each case, considered by themselves, in the manner of an open air-core coil, but are connected at their ends in each case via a bridge 10, 11 made of magnetically conducting material to form the closed magnetic circuit 7.

"Magnetically conducting material" is understood to mean every highly permeable material known in the prior art, such as iron or any other ferromagnetic material, the relative permeability $\mu_r$ of which is large as compared to air ($\mu_r=1$); for example, the relative permeability $\mu_r$ of iron is in the range from 2000 to 5000. The magnetic conductivity of the bridges 10, 11 is thus preferably three to four orders of magnitude higher than that of the helical springs 8, 9, so that they practically represent a magnetic short at the ends of the helical springs 8, 9. This also has the advantage that the geometry at the ends of the helical springs 8, 9, in particular the exact form and position of the bridges 10, 11, can be largely neglected and the inductance L of the coil 4 practically only depends on the current deformation of the helical springs 8, 9.

The current value of the inductance L of the coil 4 is ascertained using an electronic circuit 12 which determines therefrom the current relative position of the parts 2, 3 using equation (1) and, if appropriate, corresponding calibration and correction diagrams, as is known to the person skilled in the art.

By way of example, the circuit 12 can contain a resonant circuit whose inductive component is formed by the coil 4 and from whose resonant circuit frequency the inductance L and thus the relative position are ascertained. The measurement value of the relative position is made available by the circuit 12 at a corresponding connection port 13.

It is also possible for one common evaluating circuit 12 to be provided for a plurality of apparatuses 1 or a plurality of coils 4.

The helical springs 8, 9 can be two separate helical springs which are electrically connected in series via a connection 14 (a connection in parallel would also be possible, not shown). The connection 14 can, alternatively, be formed by way of redirecting the central part of a single long helical spring. The helical springs 8, 9 are fixed, at the location of their connection ends 16, 17 and of the connection 14, in each case mechanically at the fastening elements 5.

Figure 2:
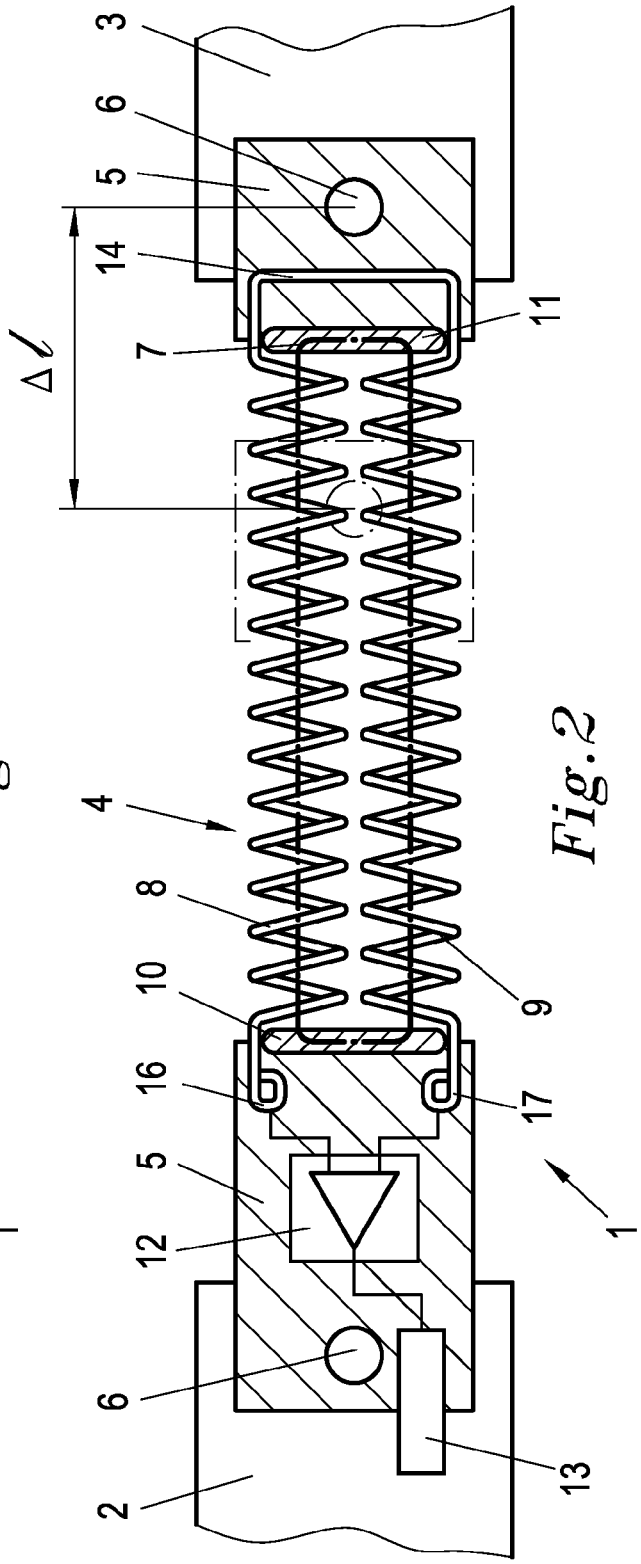

FIG. 2 shows the case of a measurement of the change in spacing between the parts 2, 3 which were moved away from each other in the longitudinal direction of the helical springs by the section $\Delta l$. The helical springs 8, 9 of the coil 4 were stretched in the process by $\Delta l$, which, according to equation (1), results in a corresponding change in inductance $\Delta L$ which is representative of the change in spacing $\Delta l$.

The invention is not restricted to the embodiments illustrated but encompasses all variants and modifications which fall within the scope of the claims.

The invention claimed is:

1. An apparatus for measuring the relative position of two parts, comprising a deformable coil connected to a first part and a second part which deforms according to the relative position of the parts, the coil having an inductance which is form-dependent and thus being a measure of the relative position of the parts, wherein the coil has a magnetic circuit which is closed in the manner of an annular coil.

2. The apparatus as claimed in claim 1, wherein the coil is an annular coil.

3. The apparatus as claimed in claim 1, wherein the coil is formed by two parallel helical springs, the helical springs are connected at their ends in each case by a bridge made of a magnetically conducting material to form the closed magnetic circuit.

4. The apparatus as claimed in claim 3, wherein the ends of the coil are fitted with fastening elements for anchoring to parts.

* * * * *